US009208369B2

(12) United States Patent
Miesak (10) Patent No.: US 9,208,369 B2
(45) Date of Patent: Dec. 8, 2015

(54) SYSTEM, METHOD AND COMPUTER SOFTWARE PRODUCT FOR SEARCHING FOR A LATENT FINGERPRINT WHILE SIMULTANEOUSLY CONSTRUCTING A THREE-DIMENSIONAL TOPOGRAPHIC MAP OF THE SEARCHED SPACE

(71) Applicant: LOCKHEED MARTIN CORPORATION, Bethesda, MD (US)

(72) Inventor: Edward Jozef Miesak, Windermere, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 156 days.

(21) Appl. No.: 14/045,030

(22) Filed: Oct. 3, 2013

(65) Prior Publication Data

US 2014/0119619 A1  May 1, 2014

Related U.S. Application Data

(60) Provisional application No. 61/720,111, filed on Oct. 30, 2012.

(51) Int. Cl.
*G06K 9/00* (2006.01)
(52) U.S. Cl.
CPC .................................. *G06K 9/00013* (2013.01)
(58) Field of Classification Search
USPC .......... 382/128, 154, 209, 294; 345/419, 653, 345/664
See application file for complete search history.

(56) References Cited

U.S. PATENT DOCUMENTS

| 6,157,747 | A | 12/2000 | Szeliski et al. |
| 7,353,994 | B2 * | 4/2008 | Farrall ..................... G06K 7/12 235/454 |
| 7,386,226 | B2 * | 6/2008 | Miyoshi et al. ................. 396/89 |
| 7,437,066 | B2 * | 10/2008 | Miyoshi et al. ............... 396/324 |
| 7,636,088 | B2 | 12/2009 | Nomura et al. |
| 7,680,314 | B2 * | 3/2010 | Hong .................... G06T 7/0087 382/131 |
| 7,804,585 | B2 * | 9/2010 | Tropf ............................. 356/3.1 |
| 7,982,868 | B2 * | 7/2011 | Akkerman et al. ........ 356/240.1 |
| 8,009,858 | B2 * | 8/2011 | Cobb ....................... H04R 1/24 181/163 |
| 8,019,449 | B2 * | 9/2011 | Barzegar ............ H04L 12/5695 700/94 |
| 8,563,934 | B2 * | 10/2013 | Yao et al. ................. 250/339.12 |
| 8,937,283 | B2 * | 1/2015 | Hatakeyama et al. ........ 250/310 |

* cited by examiner

*Primary Examiner* — Yosef Kassa
(74) *Attorney, Agent, or Firm* — Terry M. Sanks, Esq.; Beusse Wolter Sanks & Maire, PLLC (57) ABSTRACT

A system including an imaging device configured to capture one or more images of a designated area with illumination at a low optical transmission wavelength which makes a latent print or a contaminant within the designated area visible in a visible spectrum in the one or more captured images with clarity to determine an identification from the latent print or contaminant in the one or more images, and a computing system configured to create a three-dimensional image from the one or more images to provide a composite image of the designated area with the latent print or contaminant visible with clarity to determine an identification from latent print or contaminant in the composite image is disclosed. A method and a non-transitory processor readable storage medium are also disclosed.

20 Claims, 5 Drawing Sheets

SYSTEM, METHOD AND COMPUTER SOFTWARE PRODUCT FOR SEARCHING FOR A LATENT FINGERPRINT WHILE SIMULTANEOUSLY CONSTRUCTING A THREE-DIMENSIONAL TOPOGRAPHIC MAP OF THE SEARCHED SPACE

CROSS-REFERENCE TO RELATED APPLICATIONS

This application claims the benefit of U.S. Provisional Application No. 61/720,111 filed Oct. 30, 2012, and incorporated herein by reference in its entirety.

BACKGROUND

Embodiments relate to an imaging system and, more particularly, to a system and method to optically detect a latent print or contaminant upon a surface.

A latent print may be an invisible fingerprint impression, footprint impression, or palm print impression left on a surface following surface contact caused by the perspiration on ridges of an individual's skin coming in contact with the surface and leaving perspiration behind, making an invisible impression on the surface as a result. Perspiration is known to contain water, salt, amino acids, and oils, which allow impressions to be made. The natural oils of the body preserve the print, where the impression left is utterly distinct so that no two humans have the same latent print. Though discussed as being invisible above, the latent print may also be partially visible. Also, the latent print may be made of non-bodily fluids or particles.

Conventional methods for extracting fingerprints usually involve adding chemicals or powders to the print. Such conventional methods can present an immediate dilemma in that they force the investigator to make a decision as to whether to dust for prints versus swabbing for DNA evidence. Either approach results in destroying, or removing, the prints as they are originally found since the prints are no longer on their original surface.

Automatic non-contact latent fingerprint detection systems are also known that avoid the need to add chemicals or powders that can disturb the surface chemicals of the fingerprint. Such systems generally include a single light source, utilize only diffuse reflectance ((reject specular reflection (glare)), and are generally limited to fingerprinting the area of one's finger, or an area about that size. However, systems using specular reflection are also known, though they are believed to be limited. Furthermore, optically lifting a latent print occurs with an imaging system, and usually also the light emitting device, located a few inches, such as, but not limited to, about 6 inches (approximately 15 centimeters) to about 24 inches (approximately 61 centimeters) from a surface where a latent print is expected to exist. Such distances between the imaging device and surface are used because optical detection is usually critically dependent on image contrast and high resolution. Latent prints are very low contrast objects and therefore using only existing optical techniques when the print is on a rough surface is not practical. Optically lifting a finger print from longer distances has not proven to be possible since sufficient resolution and sensitivity as is obtained at the closer distance has not be realized previously. Furthermore, since latent prints are usually not visible to a human eye, depending on a size of an area to search for latent prints, chances of failing to locate and acquire all latent prints are possible.

Entities desiring to detect latent prints at a longer distance would benefit from a system and method where a latent print may be optically detected and acquired without damaging the print while also providing resolution and sensitivity with sufficient clarity to identify an entity that made the print, especially where a map of the target area may be made, such as, but not limited to, a three dimensional map, so that any doubt about missing any latent print is resolved.

SUMMARY

Embodiments relate to a system, method and computer program product to optically lift a latent print from a surface over a distance from the surface while simultaneously constructing a three-dimensional topographic map of the searched space. The system comprises an imaging device configured to capture one or more images of a designated area with illumination at a low optical transmission wavelength which makes a latent print or a contaminant within the designated area visible in a visible spectrum in the one or more captured images with clarity to determine an identification from the latent print or contaminant in the one or more images. The system also comprises a computing system configured to create a three-dimensional image front the one or more images to provide a composite image of the designated area with the latent print or contaminant visible with clarity to determine an identification from latent print or contaminant in the composite image.

The method comprises capturing one or more images of a designated area with an imaging device that produces an illumination at a low optical transmission wavelength which makes a latent print or a contaminant within the designated area visible in a visible spectrum in the one or more captured images with clarity to determine an identification from latent print or contaminant in the one or more images. The method also comprises creating a three-dimensional image with a computing system from the one or more images to provide a composite image of the designated area with the latent print or contaminant visible with clarity to determine the identification from latent print or contaminant in the composite image.

The computer program product is a non-transitory processor readable storage medium which provides an executable computer program product, the executable computer program product comprising a computer software code. When executed on a processor, the processor is caused to initiate capture of one or more images of a designated area with an imaging device that produces an illumination at a low optical transmission wavelength which makes a latent print or a contaminant within the designated area visible in the one or more captured images with clarity to determine an identification from latent print or contaminant in the one or more images and to create a three-dimensional image with a computing system from the one or more images to provide a composite image of the designated area with the latent print or contaminant visible with clarity to determine an identification from latent print or contaminant in the composite image.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION OF THE INVENTION

Embodiments are described herein with reference to the attached figures, wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Though embodiments are disclosed with respect to latent fingerprints, the embodiments are also applicable to other latent markings or prints as well, such as, but not limited to, a footprint, a palm print, etc. As used herein, "latent print" comprises a latent fingerprint and other imprints that may be recognizable to distinguish an entity from another. Latent fingerprints, which are impressions left by the friction ridges of a human finger, may be composed of almost any material, including, but not limited to, grease, oil, sweat, wax, etc. "Latent" as used with respect to fingerprints and/or other prints means a chance or accidental impression left on a surface, regardless of whether visible or invisible at time of deposition. Embodiments are also application to other surface contaminants. The term "contaminant" is not limited as it can also apply to a latent print. Other non-limiting examples of a contaminant may include blood or another body fluid, a fracture in a surface, a physical defect in the surface, etc.

Figure 1:
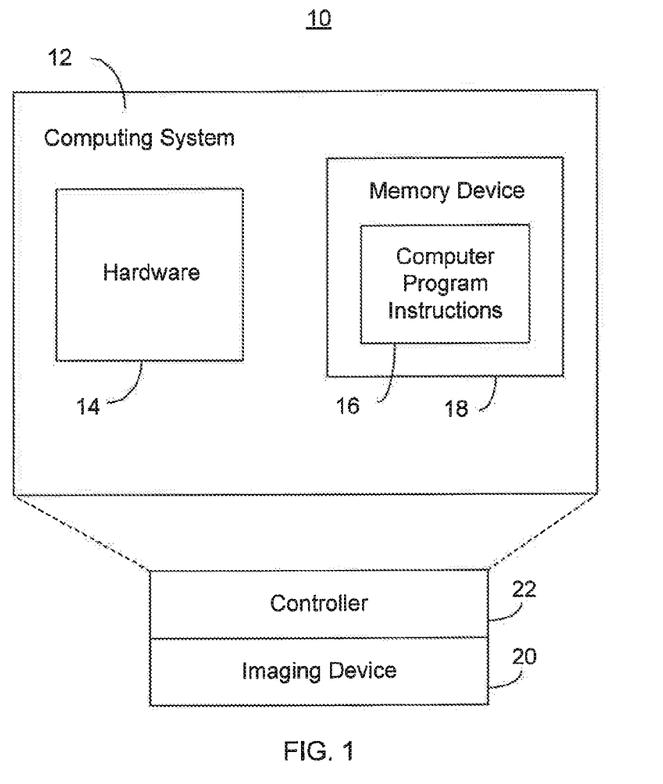
FIG. 1 shows a block diagram representing an embodiment of a system.

FIG. 1 shows a block diagram representing an embodiment of a system for creating a three dimensional (3D) map of a scene and/or object while also searching for latent forensic evidence. Since a crime scene investigator might miss a piece of latent evidence at a crime scene which may be vital to solving a crime, a system which allows the investigator to verify complete examination of the scene and/or object is beneficial. As illustrated the system 10 may comprise a computing system 12, which may comprise hardware 14 and computer program instructions 16 stored on a memory device 18 to register a position and/or orientation of an imaging device 20 as the imaging device 20 optically captures images of latent fingerprints and a location and/or surface where the latent fingerprints are located within a designated area or target. The separate images are then integrated to form a 3D replica of the scene and/or object (otherwise known as a "designated area") being searched. The system 10 may further comprise a controller 22 to position and/or orientate the imaging device 20. The controller 22 may be operable via voice command. In another embodiment, the voice command feature may allow the investigator to dictate a narration of the scene as the system 10 captures images.

Figure 2:
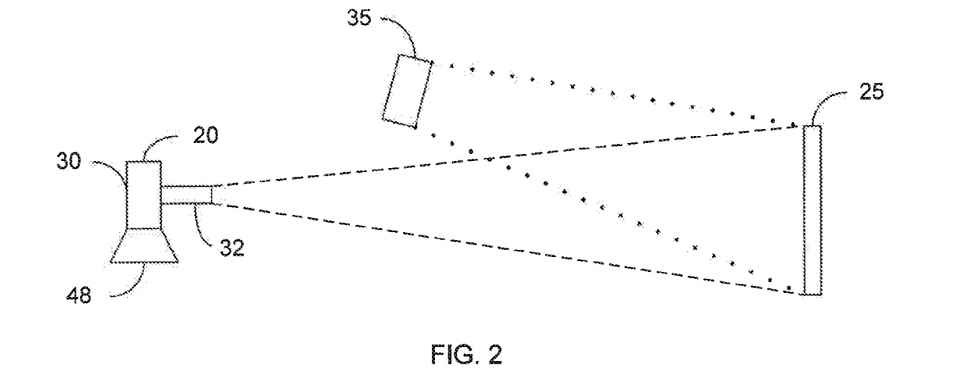
FIG. 2 shows a schematic representation of an embodiment of a system.

FIG. 2 shows a schematic representation of a system for optically lifting a latent fingerprint over long distances. Though not a part of the system 10, a target 25, or designated area, is disclosed. The target 25 may be a surface where a latent fingerprint(s) may exist. As used herein, the target 25 may be a room where a crime, such as, but not limited to, a theft or murder was committed. As a part of the system 10, the imaging device 20, which may comprise a camera 30, is provided. A lens 32 capable of imaging the target 25 from a given distance while still providing a necessary resolution and sensitivity of the target 25 and clarity of a latent print on the target 25 is also provided as a part of the imaging device 20. A non-limiting example of a type of lens 32 which may be used is a 180 millimeter macro lens. A light emitting device 35, or light source, is also provided. In an embodiment, the light source 35 is located away from the target 25 and the camera 30 where a line of sight of the light source 35 merges with a line of sight of the camera 30, or lens 32, prior to reaching the target 25.

A preferred distance for the light source 35 is at a location where when providing illumination, the illuminated light does not overfill the target 25 and/or location on the target 25 where the latent fingerprint may exist. Typically a light source 35 used with a camera 30 has a diverging lens such that a collimated beam of light passing through the lens is diverged or spread. In an embodiment, the light source 35 may be without a diverging lens so as to prevent an illuminated light from spreading (diverging) too fast, or too soon closer to the light source 16. Thus, the light propagates at a normal or regular rate since a diverging lens is not provided to cause the light to propagate sooner.

A typical prior art distance an imaging device is placed from the target is usually 6 inches (or about 15 centimeters) to about 24 inches (or about 60 centimeters). As discussed herein, this distance is referred to as being proximate to the surface. This distance which is more than proximate to the surface may extend up to the capabilities of the camera 30, lens 32, and light source 35, wherein a current recognized range is between approximately (or about) 0.6 meters up to about 3 meters.

Through experimentation, the inventor provided sufficient clarity of the ridges of a latent print with the light source 35 at about 5 feet, 4 inches (approximately 1.6 meters) from the target 25 and the end of the lens 32, with the other end attached to the camera 30, being about 8 feet, 8 inches (approximately 2.7 meters) from the target 25.

Depending on the distance, which is more than proximate to the surface, from which the latent image will be optically captured, a type of light source must be used to provide sufficient clarity of a latent print captured in an image. Two preferred light sources may be used. A first light source 35 option may produce ultraviolet-C ("UVC") light and a second option may produce Long Wave Infrared ("LWIR") light. A range for UVC light may be determined by a propagation loss of emitted light through the atmosphere since very short wavelength light is highly absorbed by the atmosphere. LWIR light may propagate much farther through the atmosphere than UVC, thus may be used further away from the target 25 than UVC light.

Though the light source 35 is illustrated as being at a certain location with respect to the camera, its location with respect to the camera is not limited. In one embodiment, the light source 35 may be located right next to the camera 30 and ideally would be built into a same case holding the camera 30. Furthermore, the light source may be aligned with a same, or nearly the same, field of view ("FOV") of the camera 30.

A base 48 may be provided, upon which at least the camera 30 is mounted. The illumination device may also be mounted on the base 48. The base 48 may be provided to turn or rotate the camera 30, as controlled by a controller 42 so that all surface areas of the target 25 may be captured in a single one image or a plurality of images which are then used to create a 3D model of the target 25. The base may be integrated into the camera 30 forming a single unit. Movement of the base 48 and hence the camera 30 are explained below.

Figure 3:
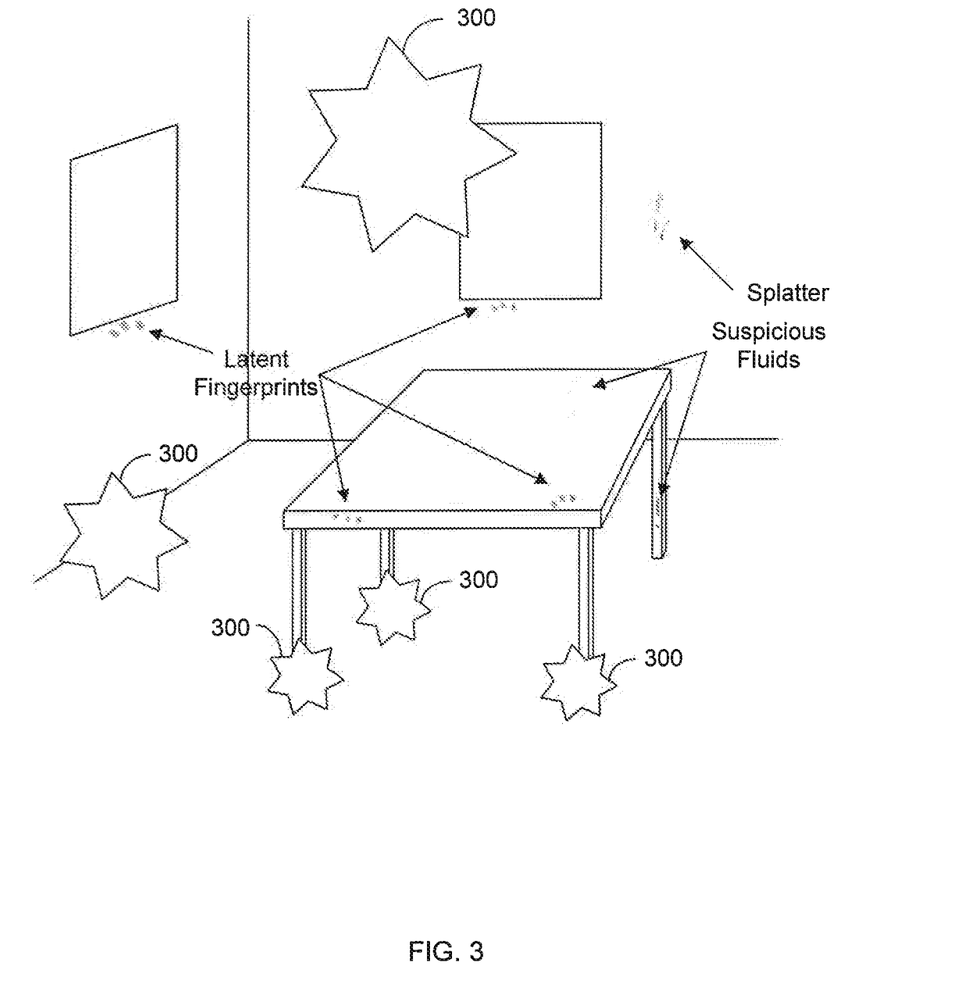
FIG. 3 shows an embodiment of a 3D model created by an embodiment of the system.

FIG. 3 shows an embodiment of a 3D model created by an embodiment of the system. As illustrated, latent prints and fluid (contaminants) are illustrated. When the system 10 completes capturing images and integrating the images, the 3D model of the scene and/or object is created. In a non-limiting example, the 3D model will illustrate objects within the scene and latent forensics evidence. The investigator is also able to review the 3D model to determine whether areas 300 of the scene and/or object were not searched or scanned. Such non-searched areas may be visible as blank areas 300 on the 3D model. If any area 300 was missed, the investigator may use the system 10 to capture images of the areas 300 omitted from the original 3D model and then construct a new 3D model with the blank areas filled in with the newly scanned images.

Figure 4:
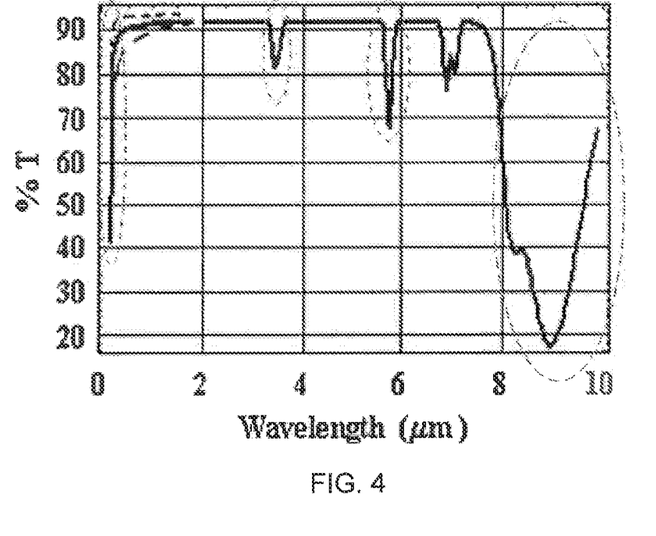
FIG. 4 shows a plot illustrating transmission percentage versus wavelength in micrometers of an optical transmission curve of a particular fingerprint material.

FIG. 4 shows a plot illustrating transmission percentage versus wavelength in micrometers of an optical transmission curve of a particular fingerprint material, and is provided to further illustrate the optical transmission regions disclosed herein. Those skilled in the art will recognize that other materials may have plots which vary slightly. Four regions are identified as marked where lower option transmission exists. The region closest to zero micrometers is in the UVC region. The region between 8 micrometers to 15 micrometers is the LWIR region.

Figure 5:
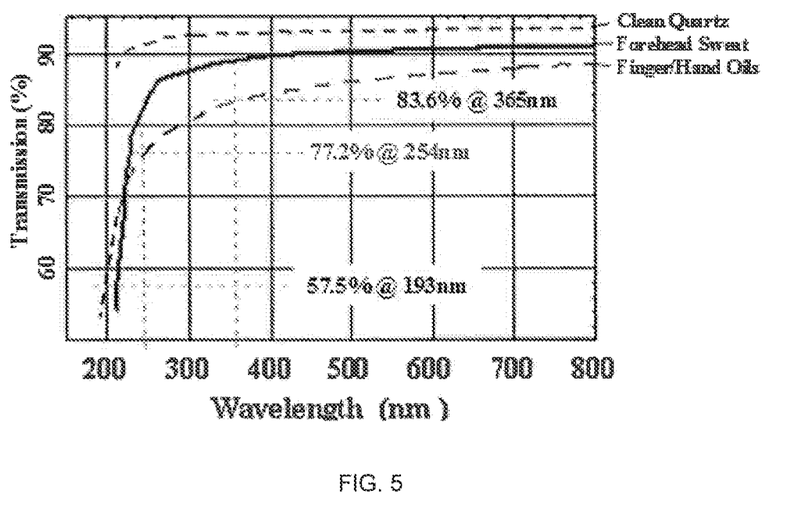
FIG. 5 shows a plot illustrating transmission percentage versus wavelength from ultraviolet wavelengths to the near infrared (NIR) of a particular fingerprint material.

FIG. 5 shows a plot illustrating transmission percentage versus wavelength from ultraviolet wavelengths to the near infrared (NIR) of a particular fingerprint material. Those skilled in the art will recognize that other materials may have plots which vary slightly. Image contrast of latent fingerprints is directly linked to their absorption. More specifically, the short wavelength portion of a transmission spectrum is disclosed where absorption of material which makes up the latent fingerprint exceeds background material. As illustrated, optical transmission decreases rapidly as the optical wavelength enters the UVC region, namely, less than 280 nanometers. These plots represent clean quartz, forehead sweat, and oils typically found on an individual's fingers/hands.

Figure 6:
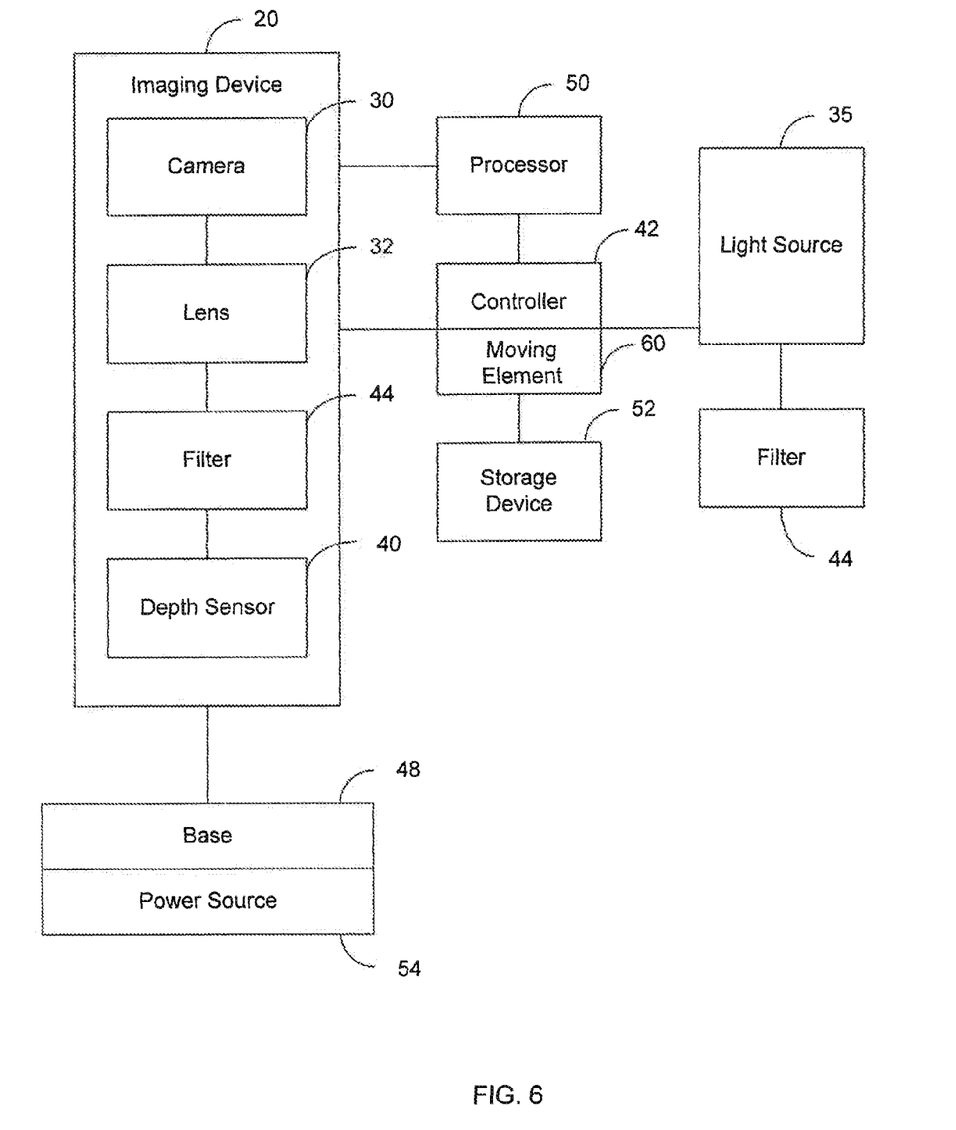
FIG. 6 shows a block diagram representing an embodiment of a system.

FIG. 6 discloses a block diagram representing an embodiment of an imaging system. As previously discussed, the light source 35 may be included. The imaging device 20 is also disclosed. The camera 30, which may be a part of the imaging device 20, may capture images at the illuminated wavelength of a light emitted by the light source 35 as well as other wavelengths not emitted by the light source 35. Capturing images at the light source wavelength may be accomplished with the lens 32 attached to the camera 30. The lens 32 may be configured to cut off, limit, or omit any wavelengths longer than the illuminating wavelengths. Thus, the camera 30 may be able to view images in the wavelength of the illuminated light as well as in visible wavelengths.

A spectral filter 44 may also be a part of the system 10 for use when fluorescence is an issue with the material composing the latent print and/or a surface upon which the print is placed. The spectral filter 44 may prevent or reduce chances of the camera 30 from picking up any fluorescence that may be emitting from the target or surface or from the latent print. In another embodiment, the spectral filter 44 may be used with the light source 35. In operation, the light spectrum which is able to pass through the filter 44 may match the spectrum of the light source 35. Depending on a type of lens used, the spectral filter 44 may always be used since it will prevent or reduce chances of the camera 30 from seeing any wavelengths other than what is required to produce the best result represented by the resulting 3D model. As a non-limiting example, the lens 32 may be a quartz lens such as, but not limited to, a fifty (50) millimeter quarts lens.

At least one depth sensor 40 is also provided so that the images are captured in 3D. The sensing range on at least one depth sensor 40 may be adjustable. In an embodiment, the at least one depth sensor 40 may be capable of automatically calibrating itself with respect to the designated area, scene and/or object where it is being used to capture image, including, but not limited to, furniture and/or other objects present. In an embodiment, the at least one depth sensor 40 may comprise an infrared laser projector combined with a monochrome complementary metal-oxide semiconductor ("CMOS") camera which captures data in 3D. The data captured in 3D may be video data or still image data. Likewise, the camera 30 may capture video data or still image data.

In another embodiment, the at least one depth sensor 40 is not used. Instead, the camera 30 uses its perspective. Perspective pertains to how images appear, particularly how far away they are. A camera's perspective may be changed by simply moving the camera 30 from one place to another or by using a perspective changing component built into camera 30. In another embodiment, the camera 30 may have at least one perspective feature. As non-limiting example, the camera 30 may be configured to shoot a plurality of versions of a same shot simultaneously, offering slightly different orientation with each shot. The computing system 12 and/or the user would then select the image or shot to be used. In another non-limiting example, the camera 30 may have a panorama imaging capability, allowing the user to capture a very wide field of view. In another non-limiting example, a picture within a picture technique may be preferred. As a non-limiting example, suppose a surface is imaged where one of the images is a closer view of a particular area with numerous latent images. The computing system 12 may combine the two pictures where the surface is shown with the close-up image inside the picture showing more of the surface.

A processor 50 is also disclosed. The processor 50 may be used to gather the data associated with the image taken by the camera 30. In an embodiment, the processor is part of the hardware illustrated in FIG. 1. The processor 50 may be used to sync the illumination of the light source 35 with the camera 30 taking the image and the depth sensor data. Captured images may then be stored within a storage device 52. The storage images may be communicated to the computing system 12 so that the 3D model is developed. In another embodiment, the storage device 52 is a part of the computing system 12, whereas the images taken are communicated directly to the computing system 12. A power source 54 may also be provided.

A motorized pivot base 48 configured to rotate the camera 30 three hundred and sixty degrees may also be provided. The base 48 may also have a motorized tilt mechanism to assist in further orientating the camera 30. An inertial measurement unit device ("IMU") and/or a micro global positing system, or moving element 60, may also be included, and used to move the camera 30 and orientate the camera 30 at different positions to ensure that the scene and/or object are completely imaged. The moving element 60 may be a part of the controller 42. Additionally, the processor 50 may also be a part of the controller 42.

In another embodiment, the system 10 may work without such hardware as the base 48 and moving element 60, storage device 52, etc. The camera 30 with its light source 35 may be a handheld unit wherein the computing system 12 receives an image from the camera and based on content in the image is able to recognize what is being imaged and its orientation.

With respect to FIG. 3, the camera 30, connected to its base 48 may be positioned within a room, or the scene. In an embodiment, the computing system 12 may then operate the camera 30 to take images of the room capturing both images in at a visual wavelength and at a wavelength which will allow latent images to be visible. The system 10 will then integrate the images so that the visual wavelength images are overlaid by the images which allow for latent images to be visible. These overlaid images are then integrated with images taken of adjacent areas of the scene to create the 3D model. In another embodiment, only images taken in the wavelength which will allow latent images to be visible are taken since by using the camera 30 as disclosed above, the images taken will display both the latent images and the actual surfaces of the room or target. These images are then integrated together with adjacent images to create the 3D model. The images may be still images or video images. The camera 30 may be repositioned and/or orientated upon its base 48, such as by the controller 42 and/or moving element 60 to capture a plurality of images of the scene with the base 48 of the camera 30 remaining at a stationary or central position with respect to the designated area, scene and/or object.

The 3D model may be compatible with a common computer aided design ("CAD") package. Using a CAD package or a CAD-Like package such as a 3D compatible reader such as Adobe®, the user may be able to manipulate the 3D model much like someone holding an object in their hands, by being able to turn it around, and looking at it from all sides. As discussed above, the user could also include close-up views of certain areas of the designated area if a closer image of a latent image needs to be viewed within the larger designated area.

Figure 7:
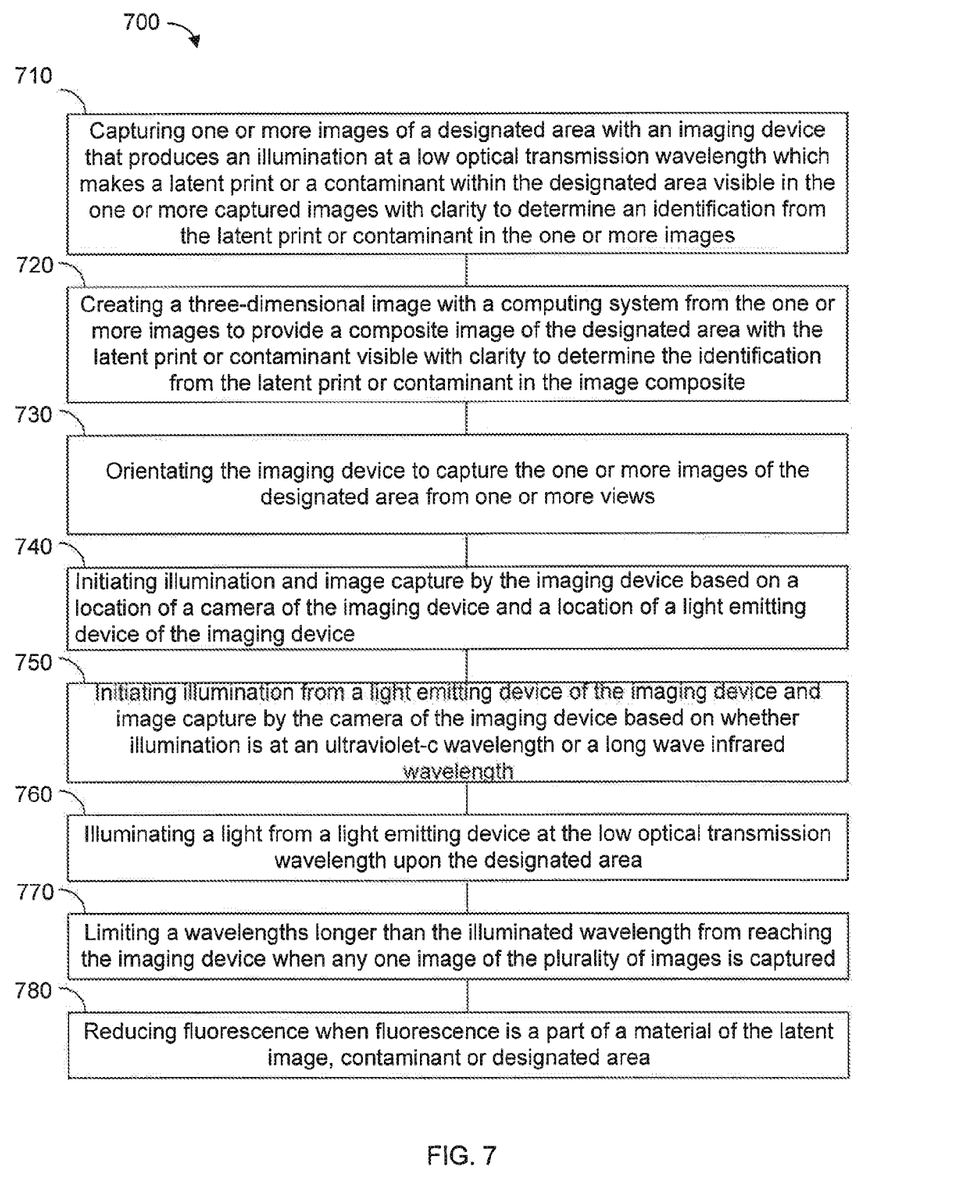
FIG. 7 shows a flowchart representing an embodiment of a method.

FIG. 7 discloses a flowchart of a method for creating a three dimensional (3D) map of a scene and/or object illustrating the scene and/or object and a latent print or a contaminant. The method 700 comprises capturing one or more images of a designated area with an imaging device that produces an illumination at a low optical transmission wavelength (or rate) which makes a latent print or a contaminant within the designated area visible in the one or more captured images with clarity to determine an identification from the latent print or contaminant in the one or more images, at 710. As a non-limiting example with respect to a latent print, a user or a detection system is able to view at least one mark of the latent print or contaminant in the image which is sufficient to make a determination of an identification of an individual who created the latent print. The method 700 also comprises creating a three-dimensional image with a computing system from the one or more images to provide a composite image of the designated area with the latent print or contaminant visible with clarity to determine the identification from the latent print or contaminant in the composite image, at 720.

The method may further comprise orientating the imaging device to capture the one or more images of the designated area from one or more views, at 730. The method may further comprise initiating illumination and image capture by the imaging device based on a location of a camera of the imaging device and a location of a light emitting device of the imaging device, at 740. The method may further comprise initiating illumination from a light emitting device of the imaging device and image capture by the camera of the imaging device based on whether illumination is at an ultraviolet-c wavelength or a long wave infrared wavelength, at 750. The method may further comprise illuminating a light from a light emitting device at the low optical transmission wavelength upon the designated area, at 760. The method may further comprise limiting wavelengths longer than the illuminated wavelength from reaching the imaging device when any one image of the plurality of images is captured, at 770. The method may further comprise reducing fluorescence when fluorescence is a part of a material of the latent image, contaminant or designated area, at 780.

Though the steps illustrated in the flowchart of the method 700 and provided in a particular sequence, this sequence is not meant to be limiting as those skilled in the art will recognize that these steps may be performed in any particular order. By applying this method and/or utilizing any embodiment disclosed herein, forensic evidence is not disturbed. Thus, there is no need to apply dusting, super-glue fuming, and/or other non-optical imaging techniques which result in material coming into direct contact with the crime scene.

Persons skilled in the art will recognize that an apparatus, such as a data processing system, including a CPU, memory, I/O, program storage, a connecting bus, and other appropriate components, could be programmed or otherwise designed to facilitate the practice of embodiments of the method. Such a system would include appropriate program means for executing the method. Also, an article of manufacture, such as a pre-recorded disk, computer readable media, or other similar computer program product, for use with a data processing system, could include a storage medium and program means recorded thereon for directing the data processing system to facilitate the practice of the method.

Embodiments may also be described in the general context of computer-executable instructions, such as program modules, being executed by any device such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. In an embodiment, the software programs that underlie embodiments can be coded in different programming languages for use with different devices, or platforms. It will be appreciated, however, that the principles that underlie the embodiments can be implemented with other types of computer software technologies as well.

Moreover, those skilled in the art will appreciate that the embodiments may be practiced with other computer system configurations, multiprocessor systems, microprocessor-based or programmable consumer electronics, minicomputers, mainframe computers, and the like. Embodiments may also be practiced in distributed computing environments where tasks are performed by processing devices located at different locations that are linked through at least one communications network. In a distributed computing environment, program modules may be located in both local and remote computer storage media including memory storage devices.

In view of the above, a non-transitory processor readable storage medium is provided. The storage medium comprises an executable computer program product which further comprises a computer software code that, when executed on a processor, causes the processor perform certain steps or processes. When executed on a processor, the processor is caused to initiate capture of one or more images of a designated area with an imaging device that produces an illumination at a low optical transmission wavelength which makes a latent print or a contaminant within the designated area visible in the one or more captured images with clarity determine an identification from the latent print or contaminant in the one or more images, and to create a three-dimensional image with a computing system from the one or more images to provide a composite image of the designated area with the latent print or contaminant visible to determine the identification from the latent print or contaminant in the composite image.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed, description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to Which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Thus, while embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

What is claimed is:

1. A system comprising:
    an imaging device configured to capture one or more images of a designated area having surfaces with illumination at a low optical transmission wavelength which makes forensic evidence including an invisible latent fingerprint on a surface within the designated area visible in a visible spectrum in the one or more captured images with clarity to determine an identification from the latent fingerprint in the one or more images; and
    a computing system configured to create a three-dimensional image of the designated area from the one or more images to provide a composite image of the designated area with the forensic evidence including the latent fingerprint visible with clarity to determine the identification from the latent fingerprint in the composite image.

2. The system according to claim 1, wherein the computing system to register a position of the imagining device and further comprising a controller configured to orientate the imaging device to capture the one or more images of the designated area from one or more views wherein the three-dimensional image is a composite image of the one or more views.

3. The system according to claim 1, wherein the system optically lifting the latent fingerprint over long distances and without disturbing the forensic evidence; and further comprising a controller configured to initiate illumination and image capture by the imaging device based on location of a camera of the imaging device and of a light emitting device of the imaging device.

4. The system according to claim 1, further comprising a controller configured to initiate illumination from a light emitting device of the imaging device and image capture by the imaging device based on whether illumination is at an ultraviolet-c wavelength or a long wave infrared wavelength.

5. The imaging device according to claim 1, further comprising a light emitting device configured to illuminate a light at the low optical transmission wavelength upon the designated area.

6. The system according to claim 1, further comprising a spectral filter configured to limit wavelengths longer than a wavelength of the illumination from reaching the imaging device when the one or more images is captured.

7. The system according to claim 1, further comprising a spectral tilter configured to reduce fluorescence when fluorescence is a part of a material of the latent image, contaminant or designated area.

8. The system according to claim 1, wherein the low optical transmission wavelength is at an ultraviolet-c wavelength.

9. The system according to claim 1, wherein the low optical transmission wavelength is at a long wave infrared wavelength between approximately 8 micrometers and approximately 15 micrometers.

10. The system according to claim 1, wherein the imaging device comprises at least one depth sensor to determine a depth of a surface within the designated area.

11. A method comprising:
capturing one or more images of a designated area with an imaging device that produces an illumination at a low optical transmission wavelength which makes forensic evidence including at least one invisible latent print within the designated area visible in a visible spectrum in the one or more captured images with clarity to determine an identification from the latent print in the one or more images without disturbing the forensic evidence; and
creating, by a computing system, a three-dimensional image from the one or more images to provide a composite image of the designated area with the latent print visible with clarity to determine the identification from the latent print in the composite image.

12. The method according to claim 11, further comprising registering, by the computing system, a position of the imaging device; and orientating the imaging device to capture the one or more images of the designated area from one or more views.

13. The method according to claim 11, further comprising initiating illumination and image capture by the imaging device based on a location of a camera of the imaging device and a location of a light emitting device of the imaging device.

14. The method according to claim 11, further comprising initiating illumination from a light emitting device of the imaging device and image capture by the imaging device based on whether illumination is at an ultraviolet-c wavelength or a long wave infrared wavelength.

15. The method according to claim 11, further comprising illuminating a light from a light emitting device at the low optical transmission wavelength upon the designated area.

16. The method according to claim 11, further comprising limiting wavelengths longer than a wavelength of the illumination from reaching the imaging device when the one or more images is captured.

17. The method according to claim 11, further comprising reducing fluorescence when fluorescence is a part of a material of the latent image, contaminant or designated area.

18. A non-transitory processor readable storage medium, providing an executable computer program product, the executable computer program product comprising a computer software code that, when executed on a processor, causes the processor to:
initiate capture of one or more images of a designated area at a scene with an imaging device that produces an illumination at a low optical transmission wavelength which makes forensic evidence including an invisible latent print within the designated area visible in the one or more captured images with clarity to determine an identification from the latent print in the one or more images;
initiate illumination from a light emitting device of the imaging device and image capture by a camera of the imaging device based on whether illumination is at an ultraviolet-c wavelength or a long wave infrared wavelength; and
create a three-dimensional image with a computing system from the one or more images to provide a composite image of the designated area with the latent print visible with clarity to determine the identification from the latent print in the composite image.

19. The non-transitory processor readable storage medium according to claim 18, when executed on a processor, further causes the processor to register a position of the imaging device with respect to the scene; and orientate the imaging device to capture the one or more images of the designated area from one or more views wherein the three-dimensional image is a composite image from the one or more views.

20. The non-transitory processor readable storage medium according to claim 18, when executed on a processor, further causes the processor to scan the designated area of the scene; identify un-scanned areas of the scene; and create a blank area in the composite image corresponding to the un-scanned area at the scene.

* * * * *

UNITED STATES PATENT AND TRADEMARK OFFICE
CERTIFICATE OF CORRECTION

| | | |
|---|---|---|
| PATENT NO. | : 9,208,369 B2 | Page 1 of 1 |
| APPLICATION NO. | : 14/045030 | |
| DATED | : December 8, 2015 | |
| INVENTOR(S) | : Edward Jozef Miesak | |

It is certified that error appears in the above-identified patent and that said Letters Patent is hereby corrected as shown below:

In the claims

Column 10, claim 7, line 63, delete "tilter" and insert --filter--.

Signed and Sealed this
Sixteenth Day of February, 2016

Michelle K. Lee
*Director of the United States Patent and Trademark Office*